United States Patent [19]

Simeau

[11] 4,208,547
[45] Jun. 17, 1980

[54] METHOD AND APPARATUS FOR REDUCING NOISE IN STEREOPHONIC SIGNALS

[76] Inventor: Bernard J. Simeau, 9, rue des Cites-Chadrac, 43000 Le Puy, France

[21] Appl. No.: 930,365

[22] Filed: Aug. 2, 1978

[30] Foreign Application Priority Data

Aug. 9, 1977 [FR] France .................................. 77 24495

[51] Int. Cl.² ................................................ H04H 5/00
[52] U.S. Cl. ............................. 179/1 GD; 179/1 GB; 179/1 GH
[58] Field of Search ............ 179/1 GD, 1 GB, 1 GH, 179/1 G, 1 GM, 1 GQ; 325/36, 477

[56] References Cited

U.S. PATENT DOCUMENTS

| | | | |
|---|---|---|---|
| 3,372,238 | 3/1968 | Fichtner | 179/1 GM |
| 3,752,934 | 8/1973 | Nakamura et al. | 179/1 GM |
| 3,883,700 | 5/1975 | Bauer et al. | 179/1 GB |
| 3,931,482 | 1/1976 | Sugimoto et al. | 179/1 GD |
| 3,961,276 | 6/1976 | Kurata | 179/1 GD |
| 4,016,366 | 4/1977 | Kurata | 179/1 GD |
| 4,063,039 | 12/1977 | Endres et al. | 179/1 GD |
| 4,087,641 | 5/1978 | Sugai | 179/1 GD |

*Primary Examiner*—Douglas W. Olms
*Attorney, Agent, or Firm*—Edmond T. Patnaude

[57] ABSTRACT

A noise reducer for multi-channel stereophonic signals is characterized by separate processing channels having different characteristics for the main and composite signals with means to reconstitute the phase correspondence between the signality processed separated in the two channels.

13 Claims, 4 Drawing Figures

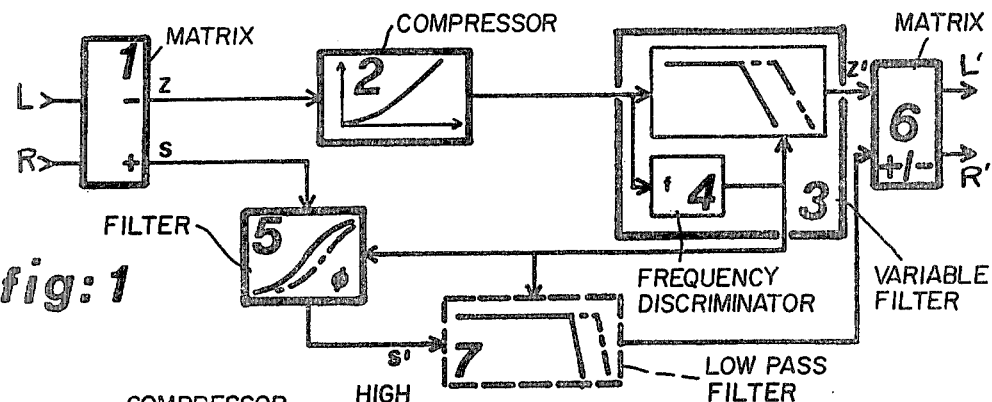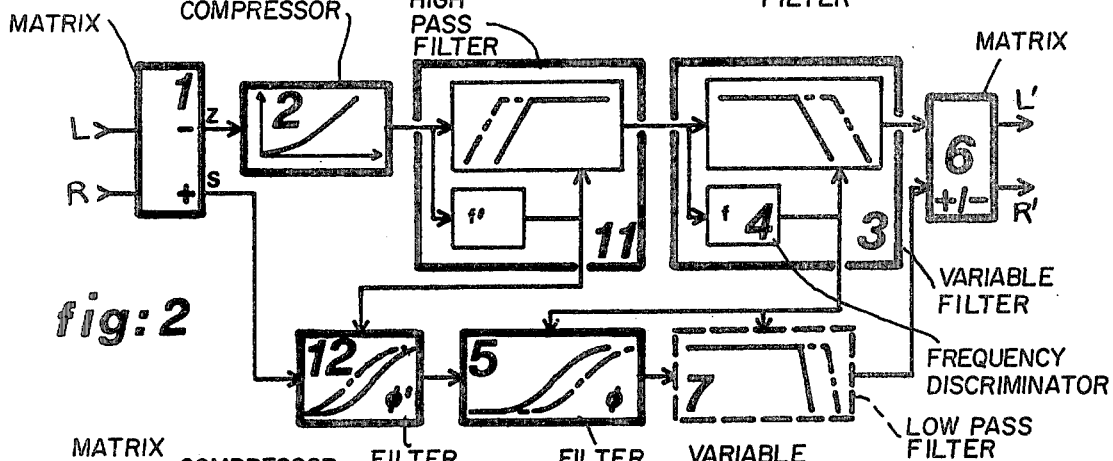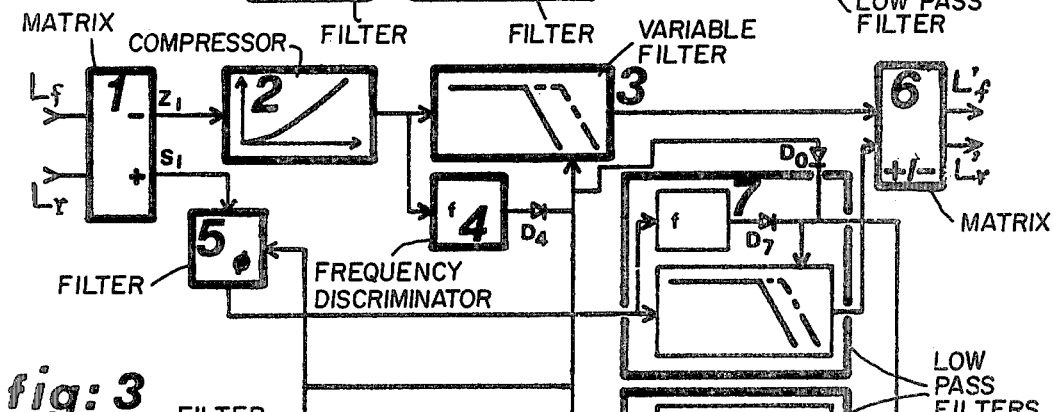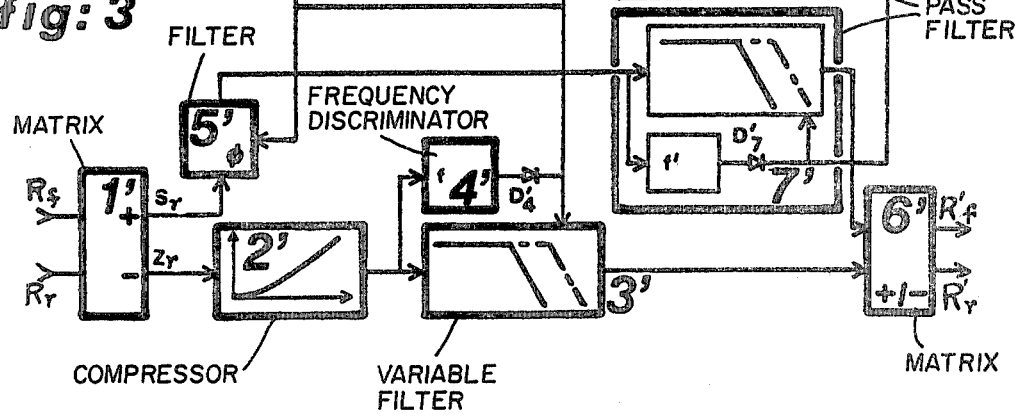

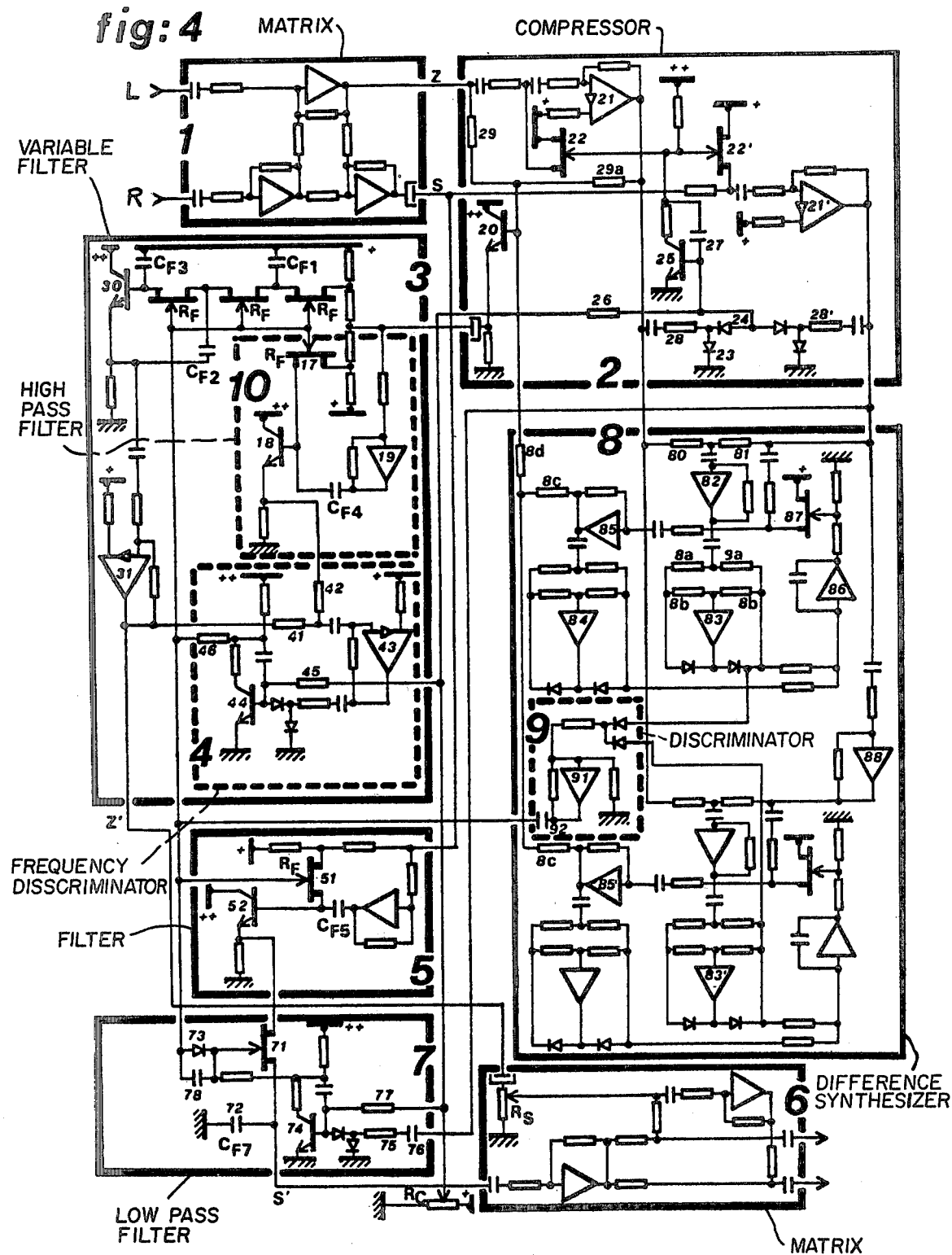

4,208,547

METHOD AND APPARATUS FOR REDUCING NOISE IN STEREOPHONIC SIGNALS

The present invention relates in particular to noise reduction systems for the reception of frequency modulated signals, and it also applies to any transmission or reproduction system or process having several channels, such, for example, as the four discrete channels used in recording on discs.

BACKGROUND OF THE INVENTION

Multiplex systems for sterophonic transmission or recording are well known, such systems using a subcarrier for transmission of certain information in an inaudible part of the spectrum are widely in use. They have several advantages among which the most important is the fact that the stero signal is compatible with monaural reproducing equipment because monaural reproduction of the primary information is always possible without the need for special equipment in the receiver or reproducer. A decoding device responsive to the subcarrier signal need be provided only if the improvement is to be employed in sterophonic reproduction of frequency modulated signals or in quadraphonic listening to disc-recordings so recorded.

This compatibility is achieved in two channel stero systems by including in the multiplex signal a "sum" or main signal (left plus right) and a subcarrier modulated by a "difference" or composite signal (right minus left). Generally speaking, the main signal is a signal directly usable in monaural devices and is generally transmitted just as it is, while the composite signal is a signal resulting in non-directly usable information and is generally transmitted by modulation of a subcarrier.

Although these systems are satisfactory in theory, in practice they are accompanied by an important degradation of the signal-to-noise ratio when the subcarrier signal is used to carry the composite signal. The reason for this degradation is essentially that the part of the spectrum occupied by the modulated subcarrier is reproduced in the audio spectrum with its own noise-content; this downgrading of the signal-to-noise ratio being in the vicinity of 25 dB in weighted value in FM recption when changing from monaural to stereophonic listening.

In practice, this phenomenon expresses itself by a decrease in the usable range of the stero FM transmitters. Sophisticated up-to-date receivers, mainly vehicle receivers, are provided with an automatic switching from stereo to monaural listening when the conditions for reception become unfavorable for stereo listening.

In order to reduce this defect, it has been proposed to use a noise-reduction process during transmission. This process not being a compatible one will penalize the users of existing receivers which are not adapted to correct the signals so processed. Of course, future receivers can be provided with the necessary decoding circuits. Hence there is a need for a compatible system that will permit an improvement of the signal-to-noise ratio of stereophonic signals, primarily in the case of FM reception.

The fact that such a significant downgrading of the S/N ratio occurs when changing from monaural to stero listening demonstrates that substantial noise is entirely introduced by the composite "difference" signal in the case of FM reception, for example. Accordingly, a noise reduction treatment made on this signal only will bring a noticeable improvement. What is more, inasmuch as the main "sum" signal is undisturbed by the noise reduction treatment of the composite signal and carries all of the audio frequency components of the signal, it is possible to enhance the treatment of the composite "difference" signal up to a point of some deterioration that will in fact be indistinguishable during listening because it is masked by the presence of the main "sum" signal.

SUMMARY OF THE INVENTION

The operation of the present invention is based upon the above described observation and some described embodiments of the inventions may employ the signal processing circuits disclosed in my copending application corresponding to French Application No. 77 24494, filed Aug. 9, 1977. in accordance with one aspect of the invention noise reduction means are provided to treat separately and distinguishably the "sum" and "difference" signals by reduction of the passband respectively assigned to these two signals. Auxiliary means are provided to preserve, notwithstanding the differing treatments applied to the "sum" and "difference" components, a correct phase relationship between the processed signals, in order to reproduce the full original directional information in the "right" and "left" signals obtained from recombining the processed signals.

In accordance with another aspect of the invention, a first improvement will be furthermore proposed to practically cancel in the absence of a "difference" component, or if this component is very reduced, any contribution to the transmitted noise of the noise associated with the said "difference" component.

In accordance with another aspect of the invention means are provided to restore, in those cases where the "difference" component is weak and thus eliminated by the said first improvement, directional information replacing that of the incoming signal.

GENERAL DESCRIPTION OF THE DRAWINGS

For a better understanding of the invention and of its preferred embodiments there will first be described the principles of operation of several embodiments or application variations, and then there is described a noise reducer circuit and device for stero FM reception, referring to the accompanying drawings wherein:

FIG. 1 is a block diagram of a noise reducer working by reduction of the high frequency part of the audible spectrum;

FIG. 2 is a block diagram of an improved noise reducer working by reduction of the high and low frequency parts of the audible spectrum;

FIG. 3 is a block diagram of a noise reducer for processing quadraphonic signals;

FIG. 4 is a detailed schematic diagram of a noise reducer according to FIG. 1 and provided with various improvements.

DETAILED DESCRIPTION OF THE INVENTION

The block diagram of FIG. 1 shows the fundamental principle of operation of a noise reducer embodying the present invention.

A first circuit 1, receiving the right R and left L signals, combines them to deliver the sum signal S and difference signal Z. Obviously this circuit 1 could be eliminated if a decoder (not shown) were employed to supply directly the S and Z signals.

The Z signal is applied to a device 2 provided with a nonlinear transmission characteristic, having a very low or null transmission slope for the low-level signals and, starting from a given threshold, a linear transmission characteristic. This device, may be a well known modulation compressor having different time constants in response to an increase or a decrease of the signal strength in order to minimize the distortions that can appear in rapidly changing signals.

The device 2 can have an adjustable function threshold (function, for instance of the average conditions of reception) below which the reduction of the transmission gain is effective; it can also be disconnected, or even suppressed in simplified noise reducers.

Its scope is essentially, when its threshold of functioning is fixed slightly above the noise level of the Z signal, to attenuate or even to cancel the transmission of the noise proper in this signal.

The Z signal eventually modified by the circuit 2 is then applied to a so-called noise reducer 3. This device is of a dynamic type, i.e. it adjusts itself in function of the content of the applied signal in order to restrict to a reduced value the transmitted bandwidth, including the part of the spectrum effectively occupied by the Z signal. One such device is described in my copending application referred to above.

Its function is essentially, when the part of the audio spectrum occupied by the Z signal is smaller than the audible bandspread, to eliminate the noise components of the Z signal which are outside the part of reduced spectrum assigned to the Z signal.

Taking into account the physiological mask-effect characterizing the human hearing, it is possible to assign to the Z signal a band significantly wider than that which is strictly needed without any discernible effect during listening.

This circumstance will be usable in the presence of a high level Z signal, to maximize the transmitted pass band so as to practically obliterate any residual effect of the device.

Several known means, up to now mainly used in monoaural noise reducers, are usable to accomplish the function of the circuit 3. A preferred means is described in detail hereafter.

Generally speaking, each of these means gives the expected results for the noise reduction of the Z signal. Nevertheless, although the said signal is intended to be combined later on with a sum signal (S) differently processed, the phase relationship between these two signals will generally be highly altered with the result that the necessary algebraic additions cannot be made without inducing an exagerated and unacceptable cross-talk between the R and L channels.

In order to remedy this, the present invention provides for the recovering of a proper relationship between the phase of the Z processed signal (Z') and the S signal by means of an all-pass filter 5 (only phase correcting) operating on the S signal to reproduce as accurately as possible the phase change induced in the Z signal by the noise reducer 3.

This phase-correcting circuit 5 is controlled by the noise reducer 3, which must consequently comprise a control of its cut-off frequency elaborated by an internal circuit 4. This control must be sufficiently accurate to inform validly the phase-correcting circuit 5 of the phase-change versus frequency characteristic that it has to reproduce.

Consequently, the filtering means 3 and the associated phase-changing network 5 will be advantageously designed according to the same technology, as it will be indicated in the example described hereinafter, to allow good reproducibility of the phase-changing characteristics of the two circuits needed to limit the cross-talk residue after recombining of the Z' and S' signals to a satisfactory value of for instance 35 dB in the useful bandwidth.

Lastly, the recombining of the phase-corrected S signal (S') with the signal Z' will constitute usable modified left and right signals (L' and R'), in the circuit 6.

On the basis of the principle above-described, many improvements can be added within the field of the invention.

At first, a noise reducing treatment can be also accomplished on the sum signal S, before or after operation thereon by the phase-changing network 5.

The effect of this circuit, represented within the dashed lines 7 of FIG. 1 will be similar to that of the circuit 3; however, taking into account the very low noise contribution of the signal S in regard of that of the signal Z, it will be sufficient to use a less elaborate noise reducer 7 for the treatment of the S signal. Particularly, and in order to avoid the need for a phase-correcting circuit analogous to the circuit 5 to correct the Z' signal, the cut-off frequency of the filter 7 can be permanently outside of the bandwidth assigned to the Z signal by the circuit 3. It will then be advantageously scheduled that the information in the vicinity of the cut-off frequency of the noise reducer filter 3 destined to the phase-changing network 5 will be likely transmitted to the circuit 7 for limiting its field of functioning.

Secondly, the Z signal which is subjected to noise reduction by restricting the high-frequency end of its spectrum, can likewise be treated at the low-frequency end of the spectrum; the resulting improvement will be particularly noticeable in sterophonic FM, taking into account the particular appearance of the noise-spectrum in this transmission process where the low-frequency components of the noise are very important.

FIG. 2 is a block diagram of such a device where one can recognize, apart from the elements already represented in FIG. 1, a noise reducer 11 also constituted by an adaptive filter such as described in my said copending application, but acting at the low frequency end of the audible spectrum of the Z signal, as well as the associated phase-correcting circuit 12 in the treatment channel of the signal S.

Thirdly, and having the benefit of the existing low-pass filters on the S and Z channels, as shown at 3 and 7 in FIG. 1, there could be provided a radio frequency interference (RFI) limiter for the impulse-type RFI as encountered in frequency modulation. In this transmission process, interference at the receiver is most often revealed by the appearance of pulses of high amplitude and short duration superimposed on the AF signal. Taking into account the high amplitude of these pulses, the discrimination of such interference is easy, and it will be easy, after separation by a clipping type circuit, to superimpose the interference components on the frequency-control signals of the filters 3 and 7 with a polarity giving a reduction of their bandwidths. The filters 3 and 7, temporarily forced into a condition where their bandwidths are reduced to a minimum, will act then for a short time as memories in regard to the pre-existing signals and will substantially reduce the interference transmission. The example of one use of the invention that will be described hereinafter will make use of this arrangement.

In the processing of a quadraphonic signal, as supplied for example by a four discrete-channel recording system, each of the right and left channels carries in a similar manner a sub-carrier modulated by a composite differential signal: front minus rear.

Each of the right and left signals are related to the corresponding composite signal and are therefore, amenable to the type of treatment as described above. Such a process will nevertheless be relatively intricate if one wishes to save the directional effect borne by the relative phase between the four reproducing channels. It would be necessary for this purpose to correct the phase change of "right" channel resulting from the processing of the "left" channel and vice-versa.

The block diagram of FIG. 3 illustrates a simplified system which employs a common cut-off frequency for each of the two separate filtering processes of the S and Z channels, which common cut-off frequency is the highest of the cut-off frequencies individually determined for the R and L channels.

Assuming that the filters 3 and 7 for the L channels (3' and 7' for the R channels) are voltage-controlled, and that the cut-off frequencies of the filters are an ascendant function of their control voltage, the circuit, thus common, controlling the frequency of the filters 3, 3' and the associated phase-correcting networks 5, 5' will be connected to the circuits developing the control voltages 4, 4' through the diodes $D_4$, $D'_4$ as represented in FIG. 3. In like manner, the diodes $D_7$, $D'_7$ operate similarly in regard to the noise reduction circuits of the "sum" main channels. The phase relationship versus frequency will then be identical for the four reproducing channels within the required degree of accuracy.

It should be recognized that, under some restrictions that will be explained hereafter, the diode $D_O$ fulfills the function of limiting the cut-off frequency of the "sum" filtering circuits in regard of the cut-off frequency of the "difference" filters, as previously mentioned.

Obviously, the simplified treatment represented in FIG. 3 induces a systematic downgrading in the performance of the noise reducer circuit in one of the treated channels (R or L). Notwithstanding, this effect will be acceptable because the unmasked noise on one side is masked by the signal sent out in the same frequency-band on the opposite side.

Also, it would be preferable to design in this case the decoder circuits of the multiplex signals in order that they deliver directly the composite "difference" signals, thus permitting the elimination of the reconstituting circuits 1 and 1'.

The foregoing description of the circuits of FIGS. 1, 2 and 3 will now permit a better understanding of the detailed description of the noise reducer circuit for stereophonic FM reception shown in FIG. 4 and constituting a preferred embodiment of the invention.

The noise reducer circuit makes use of the system shown in block diagram in FIG. 1, and it comprises some additional improvements, including:
 an interference limiter circuit, and
 a circuit for restoring directional information in event of low-level Z signals.

In order to facilitate an understanding of the circuit of FIG. 4 the circuit diagram is simplified in that the power supply lines are shown only when needed: the + noted voltage is a positive supply voltage, preferably regulated, and the + + noted voltage is a second positive supply voltage having a higher value than the former regulated one.

It will be seen that the operating circuits for the main signal S and for the composite signal Z are embodied by operational amplifiers. This circuit is well known in the art and being understandable in itself does not need any particular description herein.

The circuit with a non-linear characteristic 2 works as follows: the Z signal is delivered to the amplifier 21 by means of an electronically controlled attenuator comprising a field effect transistor (FET) 22 used as an adjustable resistor. The output signal from the amplifier 21 is rectified by the diodes 23 and 24 and then applied to the transistor 25 that reacts on the gate voltage of the FET 22 thereby modify the attenuation of the signal applied to the amplifier 21.

On the other hand, a positive voltage is applied to the resistor 26 which is conducting a DC current which holds, in the absence of a signal, the transistor 25 saturated. Under such conditions, the FET 22 is biased below its pinch-off voltage, its resistance is very high and the amplification of the amplifier 21 is at a maximum value determined by the resistance values in its feed-back network.

In the presence of a Z signal, the diodes 23 and 24 rectify the amplified signal and reduce the biasing current of the transistor 25 which leaves its saturated state and, reducing the resistance of the FET 22, reduces the amplification factor of the amplifier 21. Finally, the output voltage of the amplifier 21 becomes stabilized to a value depending on the current through the resistor 26.

The capacitor 27, by its integrating function in association with the transistor 25, defines the time-constant of the amplitude-regulating circuit and filters the control voltage of the FET 22.

The circuit 2 is in fact symetrical, operating in the same way on the signal S, for reasons that will be better understood later, and it is not the value of $\bar{S}$ (averaged rectified value) which is stabilized but that of $\bar{S}+k\bar{Z}$, the k factor depending of the ratio between the values of the resistors 28 and 28', and which values are chosen to be greater than 1.

The Z signal modified by the non-linear transmission characteristic is picked up at the junction of the resistors 29 and 29a and delivered outside the circuit 2 by the transistor 20.

The ratio between the values of the resistors 29a and 29 is chosen so as to be identical to the amplification factor of the amplifier 21 obtained when the regulation loop of the output voltage of the amplifier 21 is inoperative and when $\bar{Z}$ is lower than the function threshold of the transistor 25.

Under such conditions, the available signal at the emitter of the transistor 20 is null, and remains null as long as the regulation loop does not operate. Starting from the moment that this loop does operate, the output voltage of the amplifier 21 remains constant and the signal transmitted through the resistor 29 rapidly quenches the signal transmitted through the resistor 29a.

Because of the circuit processing the S signal and because the factor k is greater than 1, the cancelling effect on the Z signal is anticipated in the presence of an S signal and becomes ineffective if the S signal is k times greater than the threshold of the transistor 25, i.e. if the S signal is strong enough to mask the noise borne by the Z signal.

Paralleling the aforementioned operation and taking into account the common control voltage applied to the FETs 22 and 22', S and Z signals processed simultaneously by a same law of dynamic compression appear at the outputs of the amplifiers 21 and 21'.

This arrangement of the circuit 2 has been preferred, mainly for its good behavior during transient conditions when the Z signal is rapidly increasing. The effect of the amplification reducer circuit vanishes by itself when the amplifier 21 goes to saturation.

The adaptive filter 3 uses an active low-pass filter of a third order Butterworth-type having its output at the transistor 30 and comprising the fixed-value capacitors $C_{F1}$, $C_{F2}$, $C_{F3}$ as also three identical resistances $R_F$ made from FETs used as adjustable resistances to cause its cut-off frequency to be varied under the control of the applied common gate voltage. The z filtered signal (Z') is lastly amplified by the fixed gain amplifier 31.

Simultaneously to its being filtered, the Z signal is applied to the circuit 10 which is a phase-correcting circuit of a know type comprising an adjustable resistance $R_F$ provided by the FET 17 used as described hereinabove and supplied by a part of the Z signal, and also a fixed-value capacitor supplied through the inverting amplifier 19 by a signal opposed to that applied to the circuit $R_F$ (17).

Thus, the transistor 18 delivers a signal of constant amplitude having an adjustable-phase which, once combined with the Z' signal by the resistors 41 and 42 of the circuit 4, synthesizes a high-pass transfer function of the third-order Butterworth type.

For greater fidelity, the ratio of the resistor 41 to the resistor 42 must be identical to the amplification factor of the amplifier 31, and the different fixed-value capacitors above-mentioned must be in the ratios:

$$C_{F1} = 1.39 \ C_{F2} = 2.55 \ C_{F3} = 0.202 \ C_{F4} = 1$$

to achieve the indicated results.

The circuit 4, which produces the control signal for the active filter, uses as the error signal from the filtering function, the signal delivered by the high-pass synthesized filter as described hereinabove, for positioning the cut-off frequency of the filter. This error-signal is amplified by the amplifier 43, then rectified, and amplified by the DC amplifier including the transistor 44, which operates in a manner similar to that of the transistor 25 of the circuit 2. A biasing resistor 45 sets the function threshold for the frequency-control of the filter.

This type of filter, chosen for its steady response curve, its quite constant group delay and its sharp attenuation slope (and consequently its high efficiency as a noise reducer), could be obviously replaced by more or less elaborate circuits, depending on the purpose of the system.

Simultaneously with the filtering of the Z channel, the phase-correcting circuit 5 provides, under the control of the control circuit 4, the phase-correction of the S channel. This circuit functions in a manner identical to that of the circuit 10 previously described.

The FET has a resistance value identical to that of the other FETs participating in the filtering functions, and $C_{F5}$ has a proportionality $C_{F5} = 0.93$ to achieve the best results for reproducing the phase-change occuring in the filter 3.

The phase-corrected S signal available on the transistor 52 is applied to the filtering circuit 7 of the S channel, which comprises a simple low-pass cell made up of the resistance of the FET 71 and the fixed value of a capacitor 72. The capacitor 72 is chosen to have a proportionality in the vicinity of $C_{F7} = 0.25$, this for limiting, by the diode 73, the cut-off frequency of the filter 7 of the S channel to a value not less than four times the cut-off frequency of the Z channel.

The control signal for the FET 71 is delivered by the transistor 74 working as frequency-meter, which receives through a short connecting time-constant provided by resistor 75 and capacitor 76 the amplitude-stabilized S signal available at the output of the amplifier 21' of the circuit 2.

As with the transistors 44 and 25 formerly mentioned, the transistor 71 is provided with a biasing resistor 77 which supplies a bias current that sets the function threshold of its frequency-meter function.

The function thresholds of these three transistors are provided with a common adjustment $R_C$ allowing to adjust, if needed, the sensitivity of the different circuits participating in the reduction of the noise level in the treated signals.

A more elaborate noise reduction process could be obtained by automatically controlling this adjustment by, for example, using the automatic gain control signal of the associated FM receiver.

The S' and Z' signals so modified are combined in the circuit 6 to reconstitute the left and right corrected signals, in a known manner. It is nevertheless possible, by means of the $R_S$ adjustment, to proportion the Z' signal in order to increase or in the case of headphone listening to decrease the stereophonic effect.

The circuit 8 in the FIG. 4 synthesizes, as formerly mentioned, a substitution signal for the Z signal when the Z' signal is weak and deleted by the circuit 2.

At first, a "right" signal, developed by means of the 80 and 81 resistors connected to the outputs of the amplifiers 21 and 21' is applied to the amplifier 82. Then, it is rectified by the circuit of the amplifier 83, working as a "perfect" double wave rectifier, where the resistors 8b are of a much higher value than the resistors 8a. In the same manner, the amplifier 84 rectifies the output voltage of the amplifier 83.

The rectified voltages are then compared and amplified by the integrating amplifier 86 to adjust, by means of the FET 87, the part of the S signal applied to the amplifier 85.

In the aggregate, the circuit reacts in such a manner that the output voltages from the amplifiers 82 and 85 remain identical, and in such manner that the amplifier 85 delivers a "pseudo-right" signal reproducing the amplitude of the real right signal but containing only the noise of the S channel.

In like manner, and using an out-of-phase S signal supplied by the amplifier 88, one synthesizes symetrically a "pseudo-left" signal available at the output of the amplifier 85'. The resistors 8c, starting from the output voltages of the 85 and 85' amplifiers synthetize a "pseudo-Z" signal which is calibrated by the 8d resistor and superimposed, at the base of the transistor 20, on the Z signal deleted at that time.

The "pseudo-Z" signal is reconstituted to provide a directional effect in reproducing the ratio between the right and left channels for very weak listening levels, without introducing noise.

As a result of the above described principle, by employing the same dynamic compressors to attenuate the Z signal on one hand, and to supply for it a substitute, on the other hand, the transition from one working mode to the other is quasi perfect and practically indistinguishable.

Because of the dynamic compression made by the amplifiers 21 and 21', the "pseudo-Z" signal developed by the circuit 8 is amplitude-limited and masked at the customary listening levels.

A feature of the just-described circuit is that the simultaneous double-wave rectification of the compressed right and left signals, processed by way of the amplifiers 83 and 83' provide a simple way in which to minimize impulse type interferences.

This latter function is carried out by the circuit 9, whose amplifier 91, provided with bias offsetting its steady-state voltage, operates to discriminate and amplify the parasitic impulse interferences and to apply them, through a short connecting time-constant circuit including the capacitor 92 and the resistor 46 to the frequency control of the filter 3. This same clamping voltage is also transmitted through the capacitor 78 to the filter 7 of the S channel.

A preferred choice of components used in this exemplary embodiment of the invention is to employ, for the amplifiers 21, 21', 31 and 43 which require a high open-loop gain, a single integrated circuit comprising four operational amplifiers of the Norton type for A.C. currents; the other amplifiers, for which a high gain is not required and which are used for secondary functions or to treat low-level signals, may be advantageously constituted by inverters in "Complementary-MOS" technology, used at a reduced supply voltage (e.g. 3 to 6 Volts) in their field of linear functioning. Six such devices are usually available in one integrated circuit housing or package.

Generally speaking, many improvements or modifications can be added to the described circuits without departing from the field of the invention. Among them, it will be possible to take advantage of the existence of the signals controlling the filter 3 or the dynamic compressor 2 to detect and display the presence of a stereophonic signal, or by adding suitable switching means to separate the Z-channel processing path in order to process efficiently a monaural signal.

Likewise, the applications of this circuit are not limited only to the cases of F.M. reception or of treatment of quadraphonic signals; the listening of magnetic or disc records could be improved by the reduction of noise from miscellaneous origins such, for example, as surface or modulation noises.

In other respects, the system and method of the invention is a compatible one, will always be able to improve recordings conducted under unfavorable conditions (i.e. it operates during a subsequent reprocessing of the signal) or follows another noise reduction process of a complementary type.

While the present invention has been described in connection with particular embodiments thereof, it will be understood by those skilled in the art that many changes and modifications may be made without departing from the true spirit and scope of the present invention. Therefore, it is intended by the appended claims to cover all such changes and modifications which come within the true spirit and scope of this invention.

What is claimed is:

1. Apparatus for reducing noise in a multi-channel stereo signal which includes a main signal portion and a composite signal portion comprising
   first and second separate signal processing channels having respectively different transmission characteristics,
   means connecting said main signal portion of said stereo signal to said first channel,
   means connecting said composite signal portion of said stereo signal to said second channel, and
   an adaptative filter connected in one of said channels
   said adaptative filter having a transfer function which varies in response to the content of the signal portion applied to the channel in which said adaptative filter is connected.

2. Apparatus according to claim 1 wherein
   the transfer function of said adaptative filter varies in response to the frequency content of said signal portion applied to the channel in which said adaptative filter is connected.

3. Apparatus according to claim 1 wherein
   the transfer function of said adaptative filter varies in response to the amplitude content of said signal portion applied to the channel in which said adaptative filter is connected.

4. Apparatus according to claim 1 comprising
   means connected in said second channel for suppressing said composite signal portion when the amplitude thereof is below a predetermined value greater than the normal noise level in said composite signal.

5. Apparatus according to claim 4, comprising
   means for deriving from said main signal a signal of low noise content proportioned amplitude and polarity to replace the suppressed composite signal.

6. Apparatus according to claim 1 comprising
   a second adaptative filter connected in the other of said channels.

7. Apparatus according to claim 6 wherein
   said adaptative filters both have substantially the same cut-off frequency.

8. Apparatus according to claim 6 wherein
   the one of said adaptative filters connected in said first processing channel has a cut-off frequency substantially higher than the cut-off frequency of the one of said adaptative filters connected in said second processing channel.

9. Apparatus according to claim 1 wherein
   said adaptative filter comprises
   adjustment means for adjusting the threshold of functioning of said adaptative filter.

10. Apparatus according to claim 1 comprising
    signaling means responsive to the operation of said adaptative filter.

11. Apparatus according to claim 1 wherein
    said channels have the same frequency vs. phase change characteristics.

12. Apparatus according to claim 1 comprising
    a low pass filter in each of said signal processing channels, and
    means for simultaneously reducing the bandwidth of said low pass filters in response to a disturbance of short duration in the stereo signal being processed.

13. Apparatus according to claim 1 comprising
    means for manually varying the amplitude of said composite signal to increase or decrease the stereophonic effect.

* * * * *